United States Patent
Andre et al.

(10) Patent No.: US 9,247,755 B1
(45) Date of Patent: Feb. 2, 2016

(54) LOIN PULLING AND SKINNING SYSTEM

(71) Applicant: Acraloc Corporation, Oak Ridge, TN (US)

(72) Inventors: Scott Andre, Oak Ridge, TN (US); Harrison A. Ailey, Jr., Knoxville, TN (US); Lawrence D. Boody, Oliver Springs, TN (US); E. Scott Pierce, Knoxville, TN (US)

(73) Assignee: Acraloc Corporation, Oak Ridge, TN (US)

( * ) Notice: Subject to any disclaimer, the term of this patent is extended or adjusted under 35 U.S.C. 154(b) by 0 days.

(21) Appl. No.: 14/218,188

(22) Filed: Mar. 18, 2014

Related U.S. Application Data

(60) Provisional application No. 61/788,903, filed on Mar. 15, 2013.

(51) Int. Cl.
  *A22C 17/00* (2006.01)
  *A22B 5/16* (2006.01)
  *A22B 5/00* (2006.01)

(52) U.S. Cl.
  CPC ................. *A22B 5/16* (2013.01); *A22B 5/0029* (2013.01); *A22C 17/0093* (2013.01)

(58) Field of Classification Search
  CPC .. A22C 17/00; A22C 17/0006; A22C 17/002; A22C 17/0073; A22C 17/008; A22C 17/0086; A22C 18/00
  USPC .......... 452/71, 82, 84, 85, 125, 127, 129, 130
  See application file for complete search history.

(56) References Cited

U.S. PATENT DOCUMENTS

| | | | | |
|---|---|---|---|---|
| 5,234,371 A | * | 8/1993 | Andre et al. | 452/171 |
| 5,295,898 A | * | 3/1994 | Andre et al. | 452/171 |
| 5,407,384 A | * | 4/1995 | Boody et al. | 452/171 |
| 5,882,252 A | * | 3/1999 | Boody et al. | 452/171 |
| 6,089,968 A | * | 7/2000 | Andre et al. | 452/171 |
| 6,155,919 A | * | 12/2000 | Haagensen et al. | 452/171 |
| 6,336,856 B1 | * | 1/2002 | Dufour et al. | 452/171 |
| 6,547,658 B2 | * | 4/2003 | Boody et al. | 452/171 |
| 7,207,880 B2 | * | 4/2007 | Bruce et al. | 452/171 |
| 7,214,129 B2 | * | 5/2007 | Couture et al. | 452/171 |
| 7,331,850 B2 | * | 2/2008 | Roy et al. | 452/171 |
| 8,292,702 B2 | * | 10/2012 | Bolte et al. | 452/134 |
| 2006/0068692 A1 | | 3/2006 | Bruce et al. | |

* cited by examiner

*Primary Examiner* — Richard Price, Jr.
(74) *Attorney, Agent, or Firm* — Luedeka Neely Group, P.C.

(57) ABSTRACT

An apparatus for processing a carcass middle portion of an animal includes a working surface onto which the carcass middle is positioned, the working surface supported by a frame above a support surface. A loin knife assembly for separating a loin portion from the carcass middle is disposed at a first selected location on the frame. A skinner assembly is disposed at a second selected location on the frame for skinning skin and fatback from the loin portion. A conveyor conveys the carcass middle past the first selected location to engage the loin knife assembly and past the second selected location to engage the skinner assembly. In preferred embodiments, the skinner assembly includes a contoured blade using a tooth roll assembly having tooth rolls of varying diameters driven by drive rolls having varying diameters based on the tooth roll diameters.

19 Claims, 15 Drawing Sheets

LOIN PULLING AND SKINNING SYSTEM

CROSS-REFERENCE TO RELATED APPLICATION

This application claims priority to U.S. Provisional Application Ser. No. 61/788,903 filed Mar. 15, 2013, and entitled "Loin Pulling System," the contents of which are incorporated by reference herein in its entirety.

FIELD

This disclosure relates generally to an apparatus for separating the loin portion of meat from carcass halves. More particularly, this disclosure relates to a loin knife assembly and a skinning apparatus for an automatic loin puller apparatus.

BACKGROUND

In the field of meat processing, such as pork processing, it is well known that excess fat is removed from the back of the loin of an animal carcass to recover the loin before final cutting and/or packing the meat for market. Typically, the carcass of the animal is cut into two halves, and then cut transversely to remove the hind and fore quarters. The resulting portion is commonly referred to as the "middle" and will be referred to herein as the "carcass middle." Each carcass middle includes a loin to be removed from the fatback. The loin is adjacent to the belly and to the backbone, or chine, and is situated between the ribs and the outer layer of fat.

Various automatic devices have been developed to provide for the separation of the loins from the carcass middle including the devices disclosed in various U.S. Patents owned by the common assignee of the present disclosure including U.S. Pat. Nos. 5,234,371; 5,295,898; 5,407,384; 5,882,252; 6,089,968; 6,547,658; and 7,207,880, the contents of which are incorporated herein by reference in their entireties for teachings regarding the general structure and operation of a "loin puller."

One of the features described in these patents, particularly the '658 Patent, is a dual blade loin knife assembly which increases the overall yield by separating the belly portion from the loin portion immediately prior to removing the fatback and skin from the loin while reducing the risk of scoring a loin portion of a carcass middle. As described and shown in the '658 Patent, the dual blade loin knife assembly includes a first loin knife referred to as a z-blade and a second loin knife referred to as a j-blade. The z-blade is configured to separate the loin from the belly portion leaving the skin and fatback intact on the loin portion. In order to obviate the need for hand finishing or a separate finishing machine, the j-blade was designed to engage the carcass middle subsequent to the z-blade to remove the skin and a portion of the fatback from the separated loin portion. However, over the years, the animals that these automatic devices process have been genetically changed to become much leaner, and the amount of fatback on the carcass middles has reduced dramatically.

As a result, the j-blade portion of the dual blade knife assembly has become less effective over time because of the lack of fat between the skin and the loin. While the system is designed to "pull out" rather than damage the loin, the lack of fatback often leaves skin remaining on the separated loin portion in order to prevent scoring of the loin. This requires more work on the loin portion at subsequent trim stations. Further, while automated skinning machines have been utilized in processing other meat portions, these devices are used to skin meat portions that have no bones. In other words, they are able to apply top pressure on the product to sufficiently flatten the meat for skinning with a straight blade. However, with respect to pork carcass middles, the separated bone-in loin portion is situated between the ribs and the outer layer of fat making it unable to be laid flat on a skinning station. Thus, anything more than minimal top pressure would result in crushing of the bones resulting in damaged loin portions and ribs.

What is needed therefore is an improved apparatus for separating the belly portion from the loin portion of a carcass middle and for removing the skin and fatback from the separated loin portion having a contoured or "saddled" shape.

SUMMARY

An apparatus for processing a carcass middle portion of an animal is disclosed having a working surface onto which the carcass middle is positioned, the working surface being supported by a frame above a support surface. A loin knife assembly is disposed at a first selected location on the frame for separating a loin portion from the carcass middle. A skinner assembly is disposed at a second selected location on the frame for skinning skin and fatback from the loin portion. A conveyor conveys the carcass middle past the first selected location to engage the loin knife assembly and past the second selected location to engage the skinner assembly. In some embodiments, the apparatus includes a plurality of skinning assemblies for selective skinning of the loin portion.

According to some embodiments, the skinner assembly includes a blade and a positional mechanism for controlling positioning of the blade, the positional mechanism is operable to articulate the blade inwards toward the loin portion as the loin portion is conveyed past the second selected location for assisting the blade in staying engaged with a contoured surface of the loin portion. In preferred embodiments, the carcass middle is conveyed past the loin knife assembly at the first selected location prior to being conveyed past the skinner assembly at the second selected location.

In some embodiments, the skinner assembly includes a blade and a plurality of tooth rolls, the tooth rolls for assisting in pulling the skin of loin portion towards the blade, and the tooth rolls operable to run in the same direction as the conveyor. The speed of the tooth rolls during skinning is preferably based at least in part on the speed of the conveyor.

According to some embodiments, the skinner assembly includes a contoured blade shaped at least in part based on a shape of the loin portion being skinned. The skinner includes a plurality of tooth rolls having varying diameters based on the shape of the contoured blade and a plurality of drive rolls having varying diameters based on the diameters of the tooth rolls for driving the plurality of tooth rolls.

In some embodiments, the frame includes a first frame portion for supporting the loin knife assembly and a second frame portion for supporting the skinner assembly, the second frame portion being disposed adjacent the first frame portion and connected to the first frame portion by the conveyor.

In preferred embodiments, a controller is provided having a plurality of stored cutting profiles for controlling movement of the loin knife assembly and skinner assembly during processing of the carcass middle, the controller being operable to select one of the cutting profiles based on one or more measured characteristics of the carcass middle including at least a temperature reading.

According to another embodiment of the disclosure, a skinning system for skinning a meat product is provided. The skinning system includes a contoured blade shaped at least in part based on a shape of the meat product. The skinning system further includes a tooth roll assembly and a drive roll assembly. The tooth roll assembly includes a plurality of tooth rolls of varying diameters based at least in part on the shape of the contoured blade, and each tooth roll includes a plurality of tooth roll engaging mechanisms for pulling the skin of the meat product towards the blade. The drive roll assembly includes a plurality of drive rolls, and each drive roll includes a plurality of drive roll engaging mechanisms configured to engage the tooth roll engaging mechanisms of one of the plurality of tooth rolls for driving the tooth roll. The diameter of each drive roll is dependent on the diameter of the tooth roll being driven by the drive roll.

According to certain embodiments, the drive roll engaging mechanisms include a plurality of drive pins disposed adjacent the outer circumference of the drive roll and extending parallel to a drive roll drive shaft. In other embodiments, the drive roll engaging mechanisms include a plurality of gear teeth disposed on the outer circumference of the drive roll.

In preferred embodiments, each tooth roll and corresponding drive roll is operable to be replaced with another tooth roll and drive roll combination having different diameters such that the shape of the contoured blade is capable of being modified.

According to some embodiments, a cleanout bar assembly is provided that includes a plurality of cleanout bars. Each cleanout bar is disposed adjacent one of the tooth rolls and the length of the cleanout bars is based at least in part on the diameter of the tooth roll the cleanout bar is disposed adjacent to.

According to certain embodiments, the skinning system further includes a positional mechanism for controlling positioning of the contoured blade, the positional mechanism being operable to articulate the contoured blade inwards toward the meat product as the meat product is conveyed past the skinning system for assisting the contoured blade to stay engaged with a surface of the meat product.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
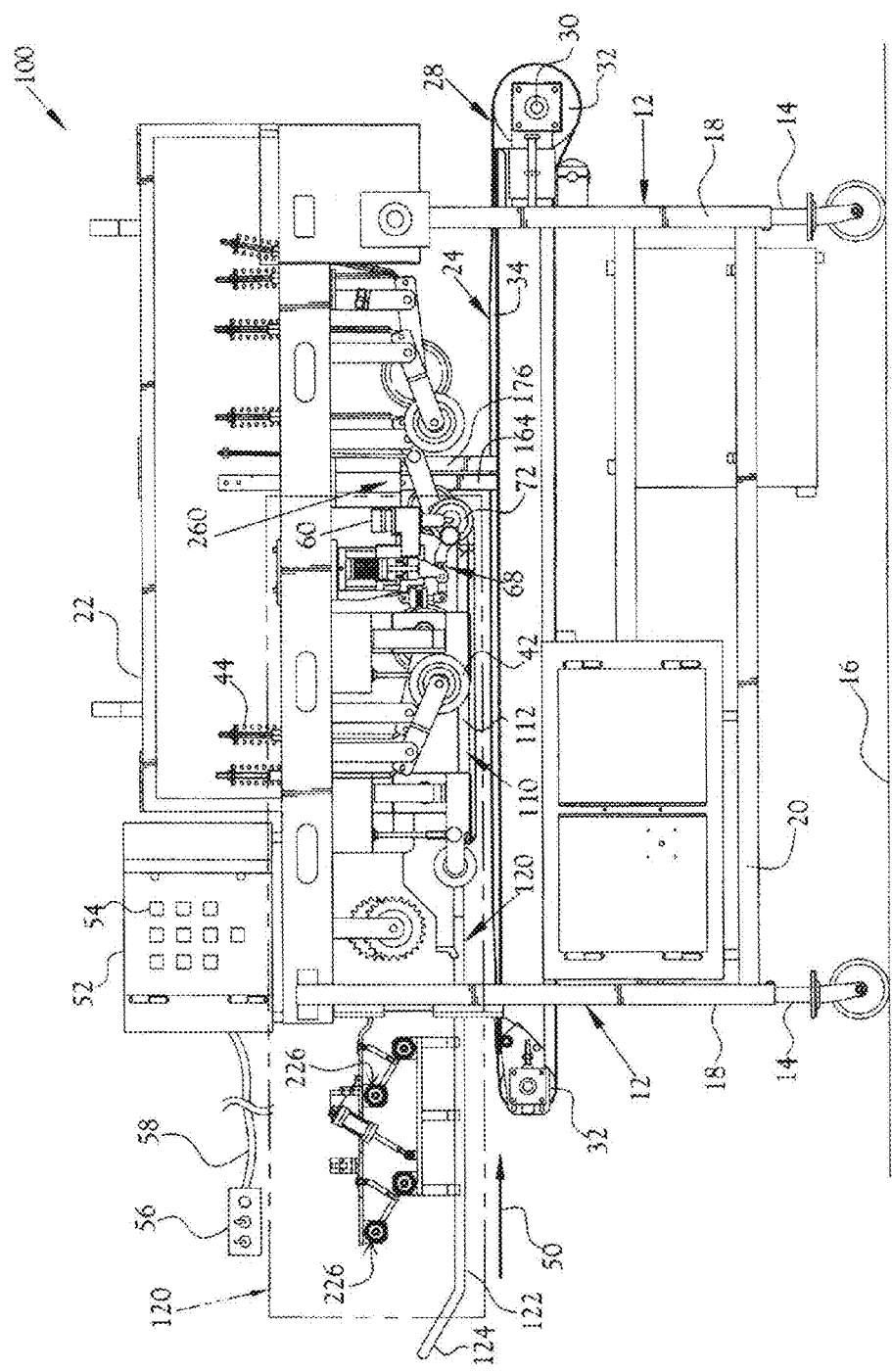
FIG. 1 is a side view of a loin puller system according to one embodiment of the disclosure.

As will be understood from review of the above-referenced patents and with reference to FIG. As will be understood from review of the above-referenced patents and with reference to FIG. 1, loin pullers 100 generally include a frame 12 provided with leg members 14 for supporting the same from a supporting surface such as a floor 16. Uprights 18 and horizontal members 20 provide further support for the various components. An upper frame portion 22 is secured to frame 12 and provides support for positioning mechanisms generally known in the art including, but not limited to, rollers 42, spring elements 44, chain drives, guide arms, guide rails, pneumatic cylinders, positioning plates, etc. These positioning mechanisms control and/or facilitate movement and alignment of the carcass middle and the various cutting implements of the system 100 as the carcass middle proceeds through the system 100. A conveyor means 24 is provided for conveying the carcass middle toward a loin knife assembly 260. The conveyor means 24 includes a conveyor belt 28, driven by a motor 30, that runs on drive wheels 32. The conveyor belt 28, in the area of support of a carcass middle, is substantially in contact with a work support surface 34.

Further, there is at least one, and preferably two, loin engagement means for advancing the carcass middle toward a loin knife assembly 260 and, in preferred embodiments, scribe saw assembly 60 to pass through ribs of the carcass middle. Scribe saw assembly includes saw blade 72 and preferably a decelerator/depth gauge assembly 68 as more fully described in, for example, U.S. Pat. No. 5,882,252. The loin engagement means for advancing the carcass middle is also more fully described in the earlier patents, which are again incorporated herein by reference, and includes a load bar assembly 110 utilized for engaging the chine portion 114 (chine portion 114 being shown in FIG. 2) of the carcass middle 116 (carcass middle 116 being shown in FIG. 2) in order to align the carcass middle 116 with the loin knife assembly 260. The load bar assembly 110 operates in cooperation with a guide bar assembly 120 to assist in aligning and moving a carcass middle 116 along elongated guide bar 122 to load bar 112 of the load bar assembly 110. Guide bar 122 engages the carcass middle 116 as it is loaded and aligned into the loin puller assembly 100. In certain embodiments, guide bar 122 is provided with a bent free end 124 as shown. Guide bar 122 is carried by a pair of bracket assemblies 226 that are constructed so as to allow guide bar 122 to travel freely in the vertical direction while substantially restricting and limiting lateral movement.

Principal control of the loin puller assembly 100 and its associated positional mechanisms is through a controller 52, which is preferably attached to the frame 12. This contains operational switches 54 and elements to indicate the condition of operation. In addition, there is a portable auxiliary controller 56 connected to the main controller 52 through a cable 58 or wireless connection for use by an operator. In preferred embodiments, controller 52, the associated operational switches 54 and the auxiliary controller 56 would be in electronic communication with a Programmable Logic Controller ("PLC") that would have selective control of the various operations of loin puller assembly 100. Progress of the carcass middle through the loin puller assembly and adjustments of the positioning mechanisms is monitored and controlled using, for example, one or more vision cameras, ultrasonic probes, temperature sensors, etc. for acquiring images, dimensions, and related information of a loaded carcass middle.

Figure 2:
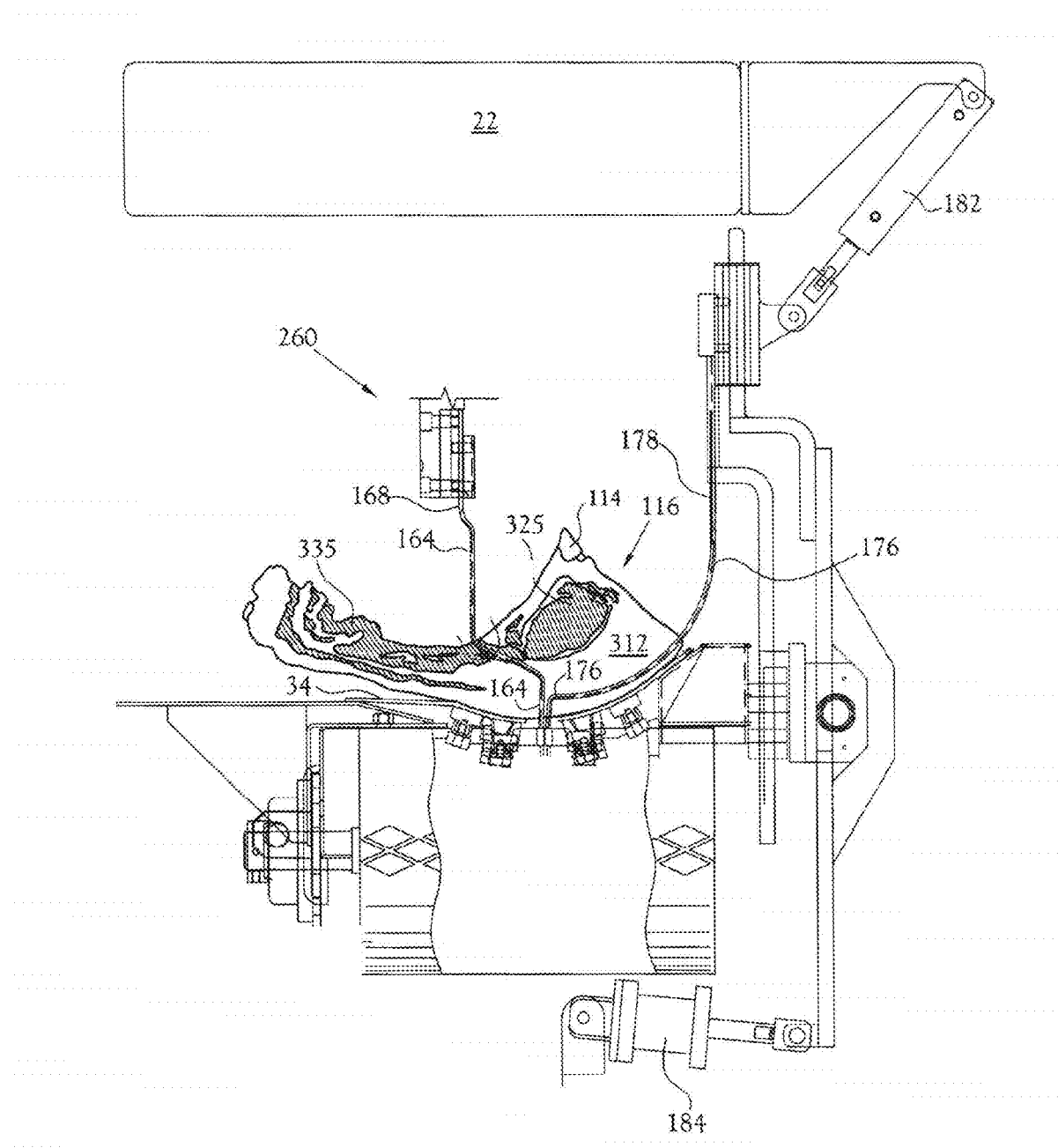
FIG. 2 is an end view of a dual-knife assembly of a loin puller system according to one embodiment of the disclosure.

Referring to FIG. 2, one embodiment of knife assembly 260 is shown as described in the '658 Patent. The dual knife assembly 260 of this embodiment includes a z-blade 164 that is configured so as to separate the loin 325 from the belly portion 335 leaving the skin and fatback 312 intact on the loin portion 325. A separate blade identified as a j-blade 176 is positioned proximate the z-blade 164 such that the carcass middle 116 engages the j-blade 176 subsequent to engagement of the z-blade 164 for removing the skin and fatback 312 from the separated loin portion 325. In preferred embodiments, the j-blade 176 is actuated by a position mechanism 182 such as a piston or pneumatic cylinder in order to vary the thickness of the fatback removed from the loin. A lower or follower positioning mechanism 184 is secured below the working surface 34 to assist upper positioning mechanism 182 with horizontal and angular positioning of the j-blade 176.

The j-blade 176 is designed as a modified partial hoop blade that includes an upper end 178 secured in spaced relation apart from the upper end 168 of the z-blade 164 to remove the skin and fatback 312 from the separated loin portion. The j-blade is intended to obviate the need for further hand finishing. However, as further explained in the Background section herein, the animals that these automatic devices process have been genetically changed to become much leaner, and the amount of fatback 312 on the carcass middles 116 has reduced dramatically. Thus, in many instances, there is no longer a consistent layer of fatback 312 to fully pull the skin off the loin portion without risking scoring of loin 325, which creates a less profitable product. As a result, the j-blade 176 portion of the dual blade knife assembly 260 has become less effective over time and increases the risk of scoring of the loin 325 in certain carcass middles 116 having almost no fatback 312.

Figure 3A:
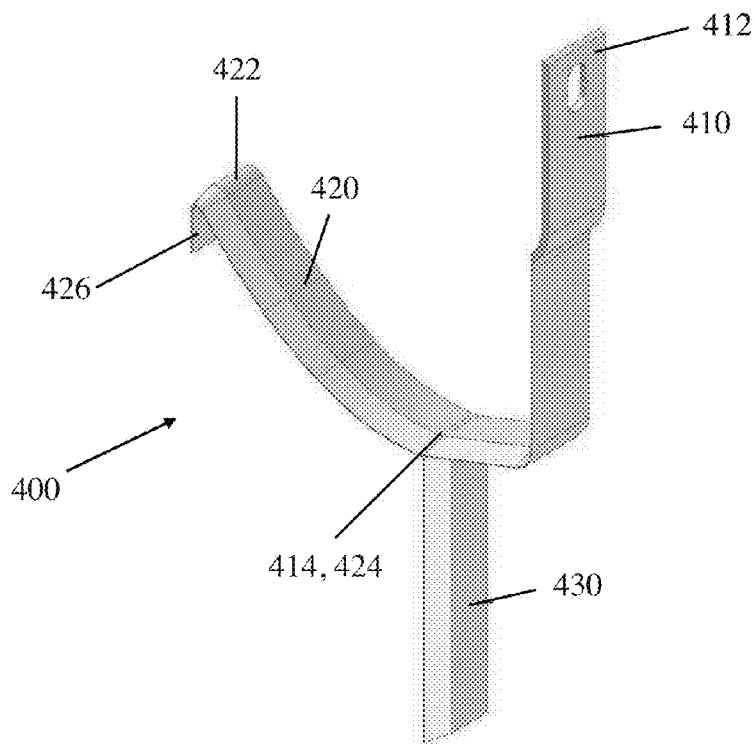
FIG. 3A is a front prospective view of a y-blade according to one embodiment of the disclosure.
Figure 3B:
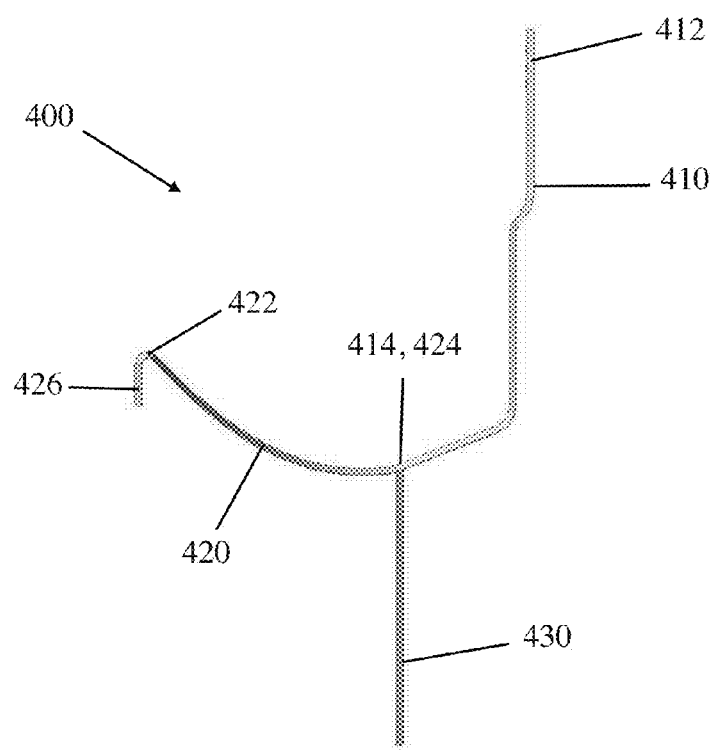
FIG. 3B is a side view of the y-blade of FIG. 3A.

Referring to FIGS. 3A-3B, the present disclosure provides a new knife assembly 260 for loin puller assembly 100 that preferably connects the dual blades into one blade, referred to herein as the y-blade 400. The y-blade 400 includes a first upper blade portion 410, a second upper blade portion 420, and a lower blade portion 430. The first upper blade portion 410 is configured to be secured at first end 412 to a positional mechanism connected to upper frame portion 22 of assembly 100 such that it is fully adjustable as to both latitudinal and longitudinal positioning depending upon the size of the loin loaded and aligned into the loin puller 100. The second upper blade portion 420 is configured to be secured to assembly at first end 422 to another positional mechanism to also facilitate movement in both the latitudinal and longitudinal direction. The first upper blade portion 410 and second upper blade portion 420 converge at their respective second ends 414, 424 forming a modified U-shape with the second upper blade portion 420 of the "U" generally extending further horizontally and less vertically with respect to the first upper blade portion 410. The lower blade portion 430 of the y-blade extends below the modified U-shaped portion adjacent the point where the first upper blade portion 410 and second upper blade portion 420 converge. The lower blade portion 430 is secured beneath the work surface 34 preferably to yet another positional mechanism such as an air or hydraulic cylinder that controls movement of the y-blade 400. In order to facilitate passage of the lower blade portion 430 through conveyer belt 28, conveyer belt 28 preferably includes a split conveyer belt system that includes two parallel belts.

Figure 5:
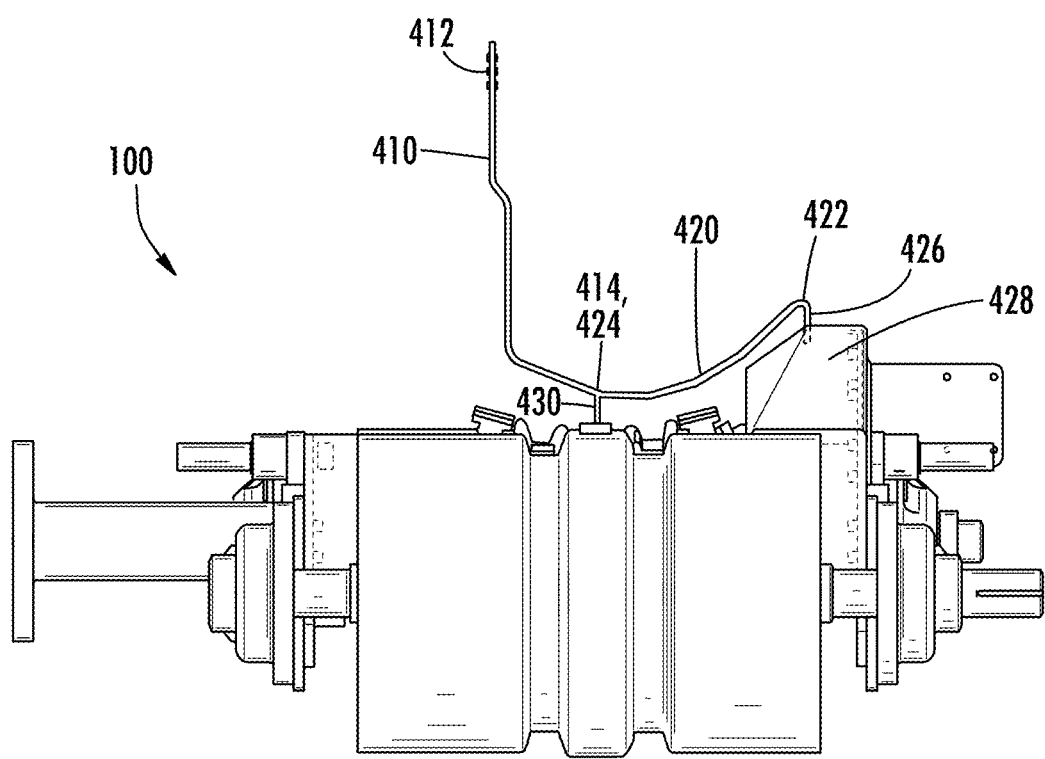
FIG. 5 is an end view of the second upper end of y-blade of FIGS. 3A-3B secured to a loin puller system according to one embodiment of the disclosure.

Referring to FIG. 5, because the second upper blade portion 420 does not extend vary far vertically, the second upper blade portion 420 is preferably secured to the assembly 100 to a positional mechanism 428 adjacent the conveyor 28 as opposed to a positional mechanism extending from the upper frame portion 22. As shown, the first end 422 of second upper blade portion 420 may in certain embodiments include a "hook" portion 426 extending back downward to secure the second upper blade portion to the positional mechanism 428 behind the conveyor 28.

In operation, the first upper blade portion 410 of y-blade 400 functions similarly to the previous z-blade described in the '658 Patent and is configured to separate the loin 325 from the belly portion 335. However, the second upper blade portion 420 is a significantly shortened version of the j-blade that is configured to trim only a small portion of the skin and fatback 312 off the bottom of the loin portion 325 to prevent scoring of the loin.

Figure 4A:
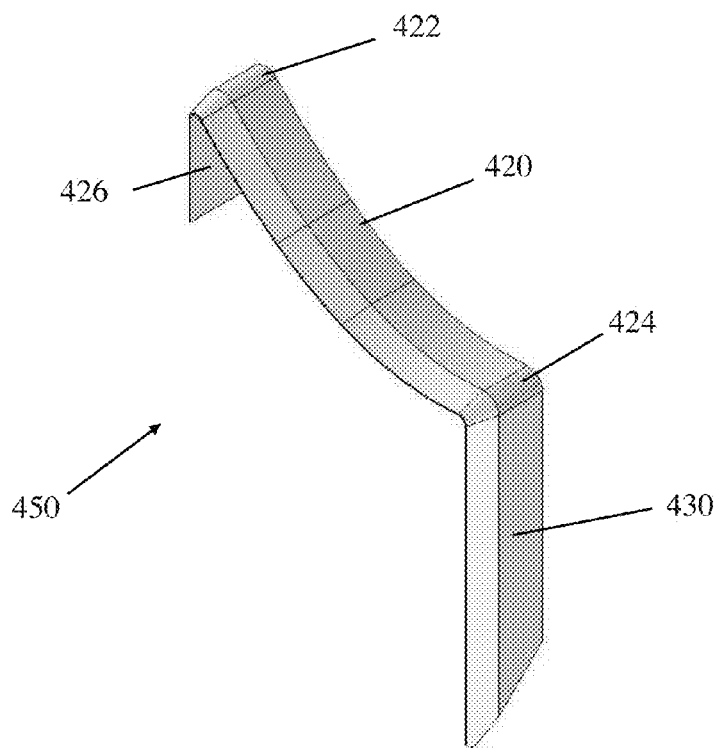
FIG. 4A is a front perspective view of a modified y-blade according to one embodiment of the disclosure.
Figure 4B:
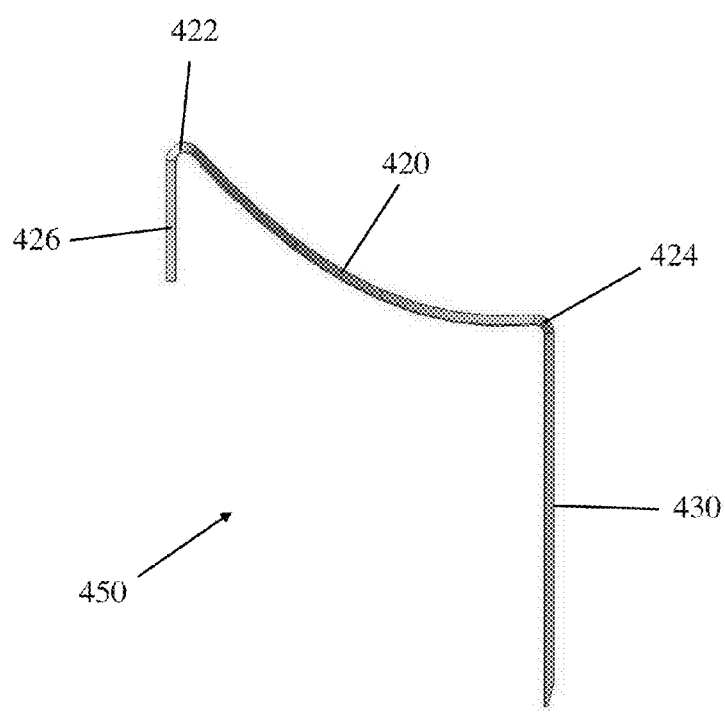
FIG. 4B is a side view of the modified y-blade of FIG. 4A.

Referring to FIGS. 4A-4B, the present disclosure also provides a modified y-blade 450 intended to be used with a z-blade as previously described in the '968 Patent. Modified y-blade 450 is configured substantially similar to the y-blade 400 except the first upper blade portion 410 has been omitted. In other words, modified y-blade 450 is essentially the second upper blade portion 420 and lower blade portion 430 of y-blade 400. Modified y-blade 450 is particularly useful for implementation with existing loin pulling systems 100 as a replacement for the j-blade 176. In such situations, referring to FIG. 2, the only critical modifications needed are to replace the j-blade 176 with modified y-blade 450 and reconfiguring positioning mechanism 182 adjacent the conveyor for the modified y-blade 450.

In alternate embodiments, loin pulling system 100 utilizes simply a single loin knife assembly that separates the loin 325 from the belly portion 335. In such embodiments, knife assembly includes a substantial equivalent of the z-blade 164 shown in FIG. 2 or the first upper blade portion 410 of the y-blade 400 shown in FIG. 3. By removing the j-blade 176 of the dual-knife assembly or the second upper blade portion 420 of y-blade 400, the risk of scoring the loin 325 is eliminated. However, the loin portion 325 will be completely skinned requiring further downstream trimming. Accordingly, y-blade 400 utilizing the second upper blade portion 420 is preferred to remove at least a portion of the skin and fatback 312.

As a result of the genetically modified loin portions and selective use (if any) of second upper blade portion 420 or j-blade 176 to only remove portions of the skin while avoiding cut depths that could score the loin 325, further skinning of the loin 325 is needed. While the skinning could be done manually, this would obviously require additional manpower and time resulting in additional expenses. Thus, the present disclosure provides several automated trimming options for modifying loin pulling system 100 to remove the skin from the loin 325, leaving only a thin fat layer and loin 325 as desired.

Figure 6:
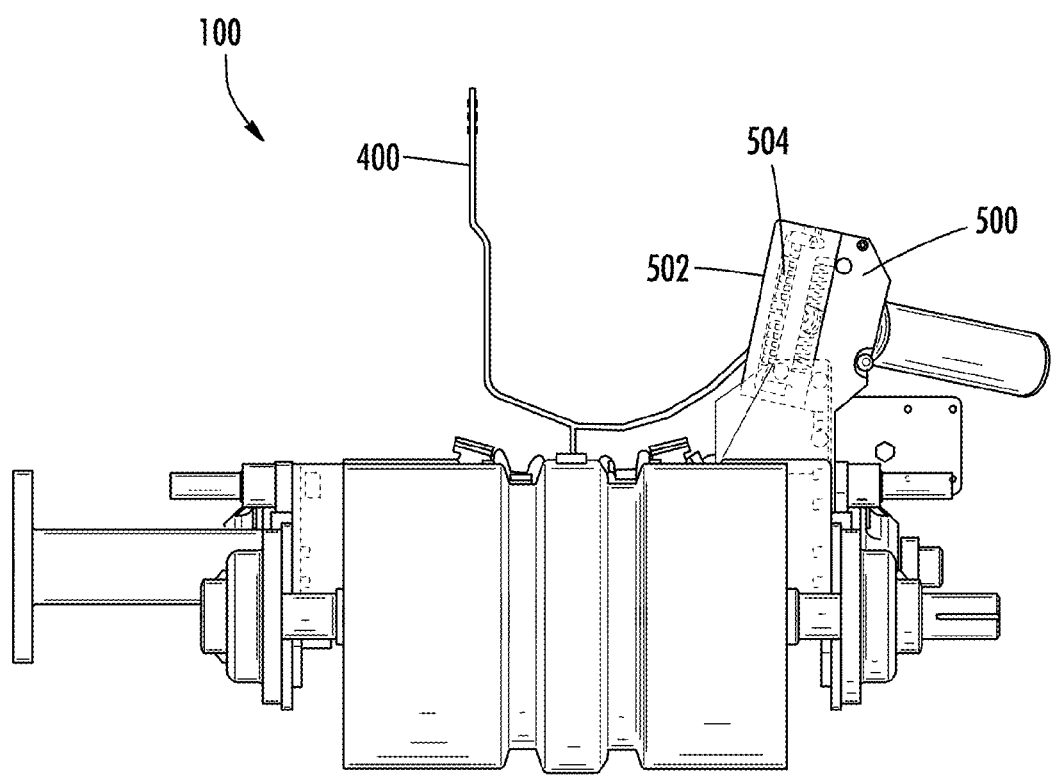
FIG. 6 is an end view of a loin puller system of FIG. 5 with a skinner secured to the loin puller system according to one embodiment of the disclosure.

In a preferred embodiment, referring to FIG. 6, y-blade 400 works in conjunction with one or more skinning devices 500 for removal of the skin and a small portion of subcutaneous material including fatback 312 from the outside portions of the carcass middles 116. While the skinning devices 500 are preferably used in conjunction with y-blade 400 as shown, it should be understood that one or more of the skinners 500 could also be implemented in other loin pulling systems 100 such as the dual blade assembly described above with j-blade 176, the modified y-blade 450, or even in situations in which only a z-blade equivalent is used.

Figure 8:
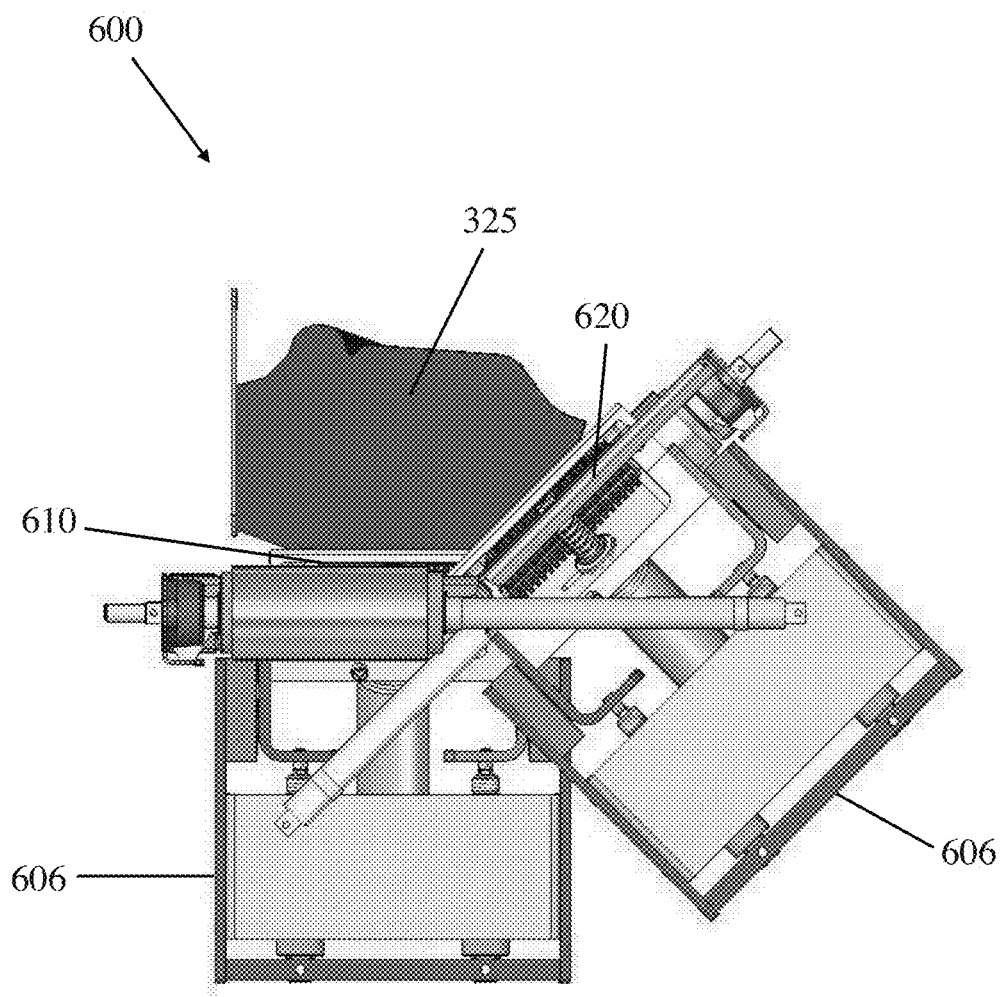
FIG. 8 is an end view of the skinner system of FIG. 7.

As shown, the skinner 500 is mounted on the apparatus 100 typically adjacent the side of conveyor 28 and preferably downstream from the y-blade 400/loin knife assembly 260. The skinner 500 is configured to articulate by a positional mechanism (example of positional mechanism is shown in FIG. 8) secured to the skinner. The skinner positional mechanism is driven by various sensors and/or by being spring mounted by traditional springs, hydraulic cylinders, etc. to keep the skinner 500 engaged in the loin 325 portion as it travels past skinner 500. Further, it is important that the positional mechanism be able to articulate the skinner 500 inward as the saddle portion of the loin 325 is exposed so as to remove a continuous strip of skin. The strip of skin may then be removed from the machine area by means of rollers, conveyors, vacuum, etc. and collected for use as a highly valuable "wrapper" of skin and fat used in further processing such as material for liver, cheese, and other products.

The skinner 500 includes a sharp blade 502 secured to tooth rolls 504 that grab and pull the product toward the blade 502 in conjunction with the conveyor 28 of system 100. In preferred embodiments, as explained further below with respect to FIGS. 12-15, the blade 702 has a contoured shape to mirror the natural curvature of the loin portion 325. Further, particularly in embodiments in which the blade is substantially straight as opposed to contoured, multiple skinners 500 may be secured to the loin puller 100 to skin various locations of the loin 325. The depth of skinner 500 can be variable by several means such as by changing out different parts with a greater allowance of depth or by mechanically or electrically changing a screw drive or servo hydraulic drive.

The tooth rolls 504 of skinner 500 preferably run in the same direction 50 as the conveyor 28 of the apparatus 100, which allows the blade 502 to flow thru rather than impact the loin 325. The tooth rolls 504 of skinner 500 can be driven by various means such as an air motor utilizing gears to provide the direction and rpm or using an electrical motor that can be operated in both directions if needed, such as if the product becomes jammed so the tooth rolls 504 of skinner 500 can run in the opposite direction to ease the jammed piece of skin or material. The electronic, hydraulic, or air motor is preferably controllable in speed and direction by the system controller 52. If the system conveyance 28 speed increases, the skinner 500 speed preferably increases or slows down so as to keep proper pace. In other words, the speed of the tooth rolls 504 is preferably dependent, at least in part, on the speed of the conveyance of the loin portion 325 through the apparatus 100.

Figure 7:
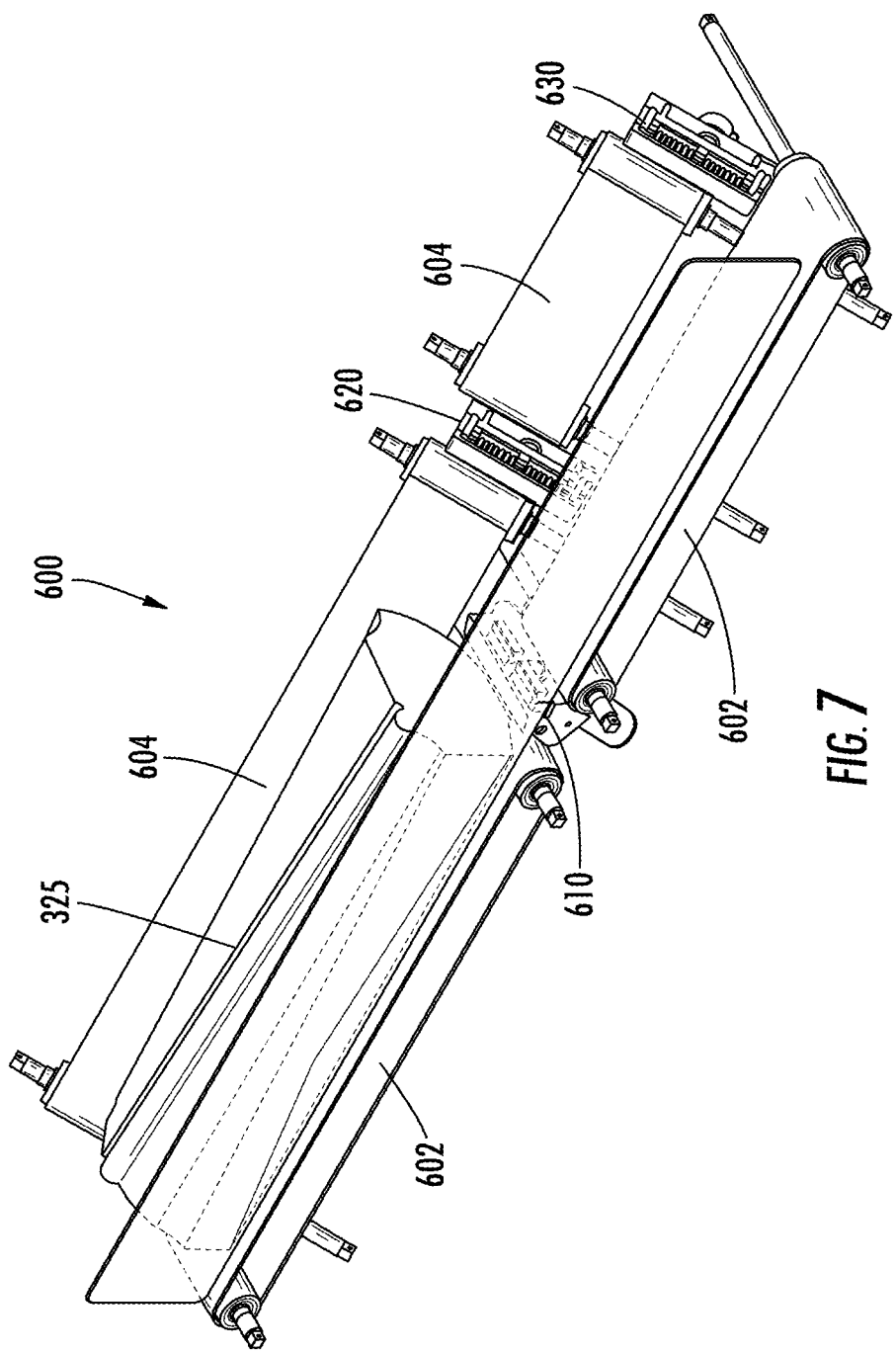
FIG. 7 is a top perspective view of a skinner system according to one embodiment of the disclosure.

Referring to FIGS. 7-8, in certain embodiments, a subsequent skinning system 600 having one or more skinners 610, 620, 630 similar to skinner 500 described above is provided as an addition to loin puller systems such as system 100 shown in FIG. 1. Skinning system 600 preferably receives pulled or processed loin portions 325 selected based on parameters selected by the customer thru information provided by apparatus 100 and/or other electronic means such as vision camera, X-ray, ultrasound, mechanical sensing, and weight and size of the product for subsequent treatment by the additional skinners 610, 620, 630. Skinning system 600 may be in addition to skinner 500 incorporated into loin pulling system 100 or may take the place of skinner 500. Skinning device 600 is particularly suited to complement existing loin pulling systems that do not include sufficient conveyor space to provide skinning devices downstream from the blade assembly. Thus, instead of purchasing an entirely new system, one can add skinning system 600 as an addition to their existing loin pulling machine.

The additional skinners are disposed in a position to receive the loin 325 conveyed by conveyor 602, which is preferably connected to a conveyor of the loin pulling system for receiving pulled loin portions 325. Skinning system 600 preferably includes an upper positional mechanism (not shown) and side positional mechanisms 604 designed to position the loin so as to allow subsequent arrangement of the skinners to provide a final or "box ready" trim. For example, referring to FIG. 7, skinner 610 is disposed along the conveyor 602 to trim the bottom portion of loin 325 and skinner 620 is disposed along the side of the conveyor 602 to trim the side portion of loin 325. Further, additional skinners such as skinner 630 may be used when additional skinning is necessary such as situations in which the loin 325 being worked includes a thicker layer of fatback 312. Similar to the skinner 500 described above, skinners 610, 620, and 630 preferably run in the same direction as the conveyor 602 of the apparatus 600 and may also include a contoured shaped blade to conform to specific dimensions of the loin 325. Further, the skinners are each secured to a positional mechanism 606 that is operable to appropriately position the particular skinner and articulate the skinner inward toward the loin 325 to follow the contoured "saddle" shape of the loin 325.

Figure 9:
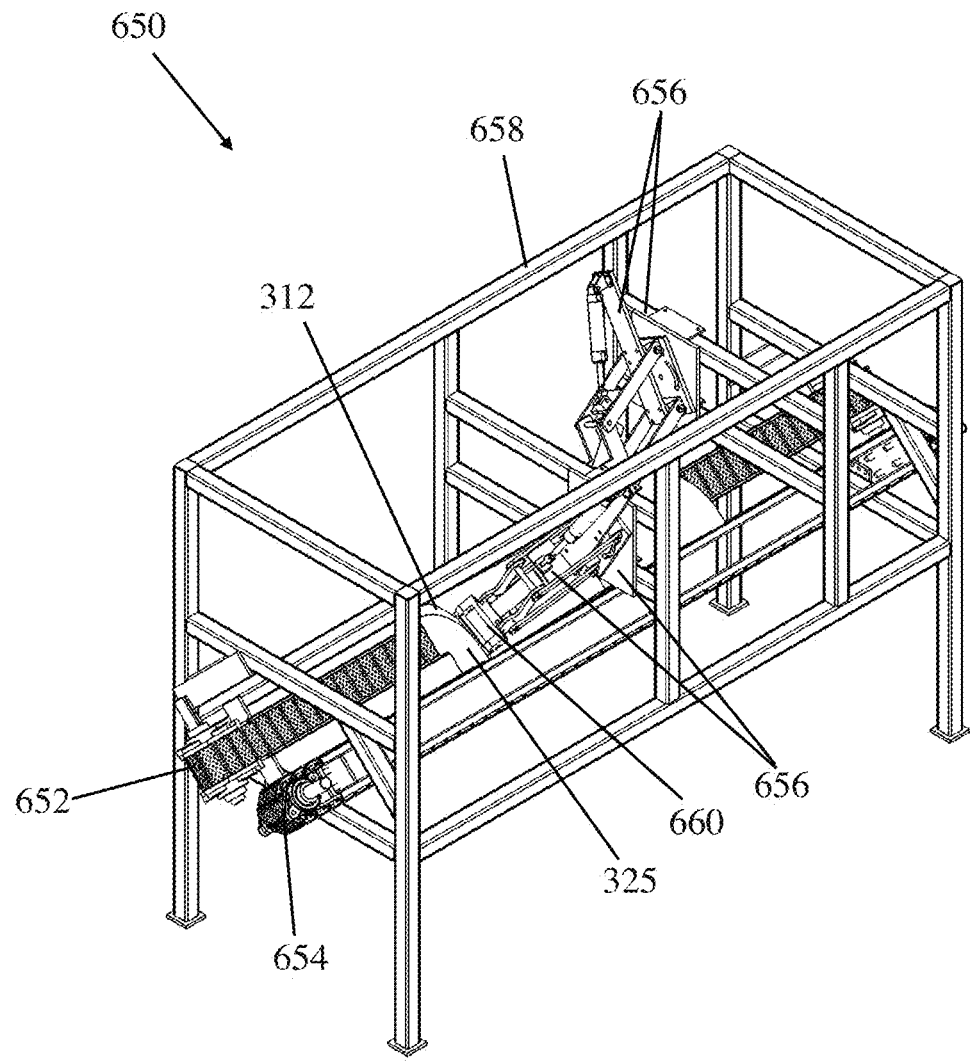
FIG. 9 is a perspective view of a skinner system according to one embodiment of the disclosure.
Figure 10:
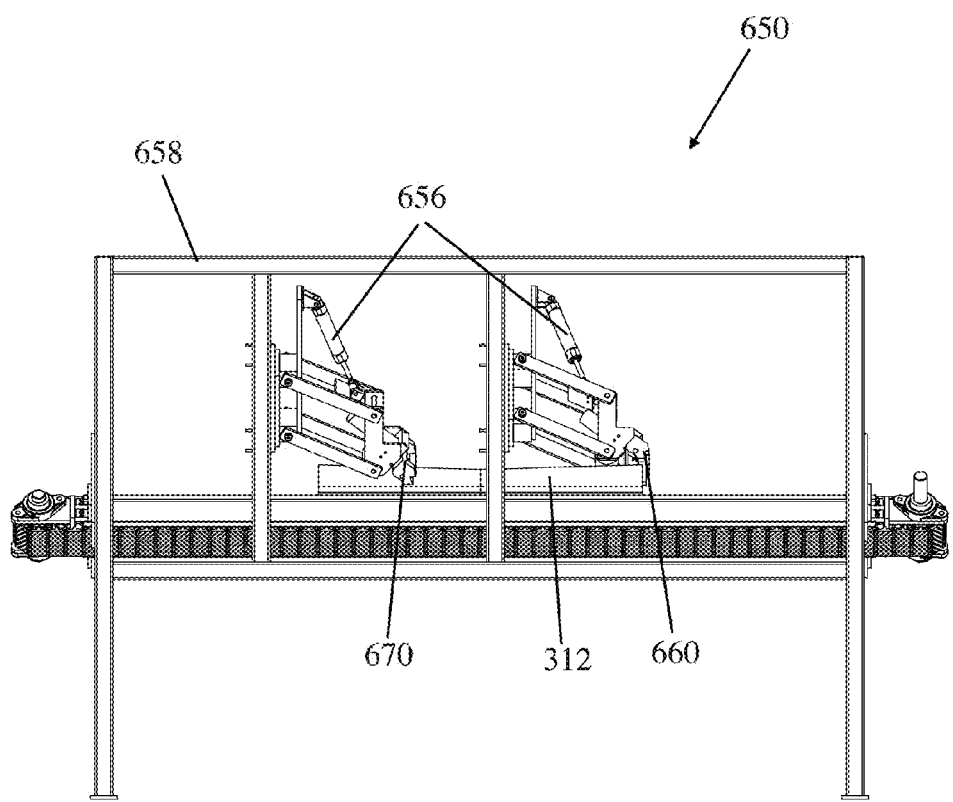
FIG. 10 is a side view of the skinner system of FIG. 9.
Figure 11:
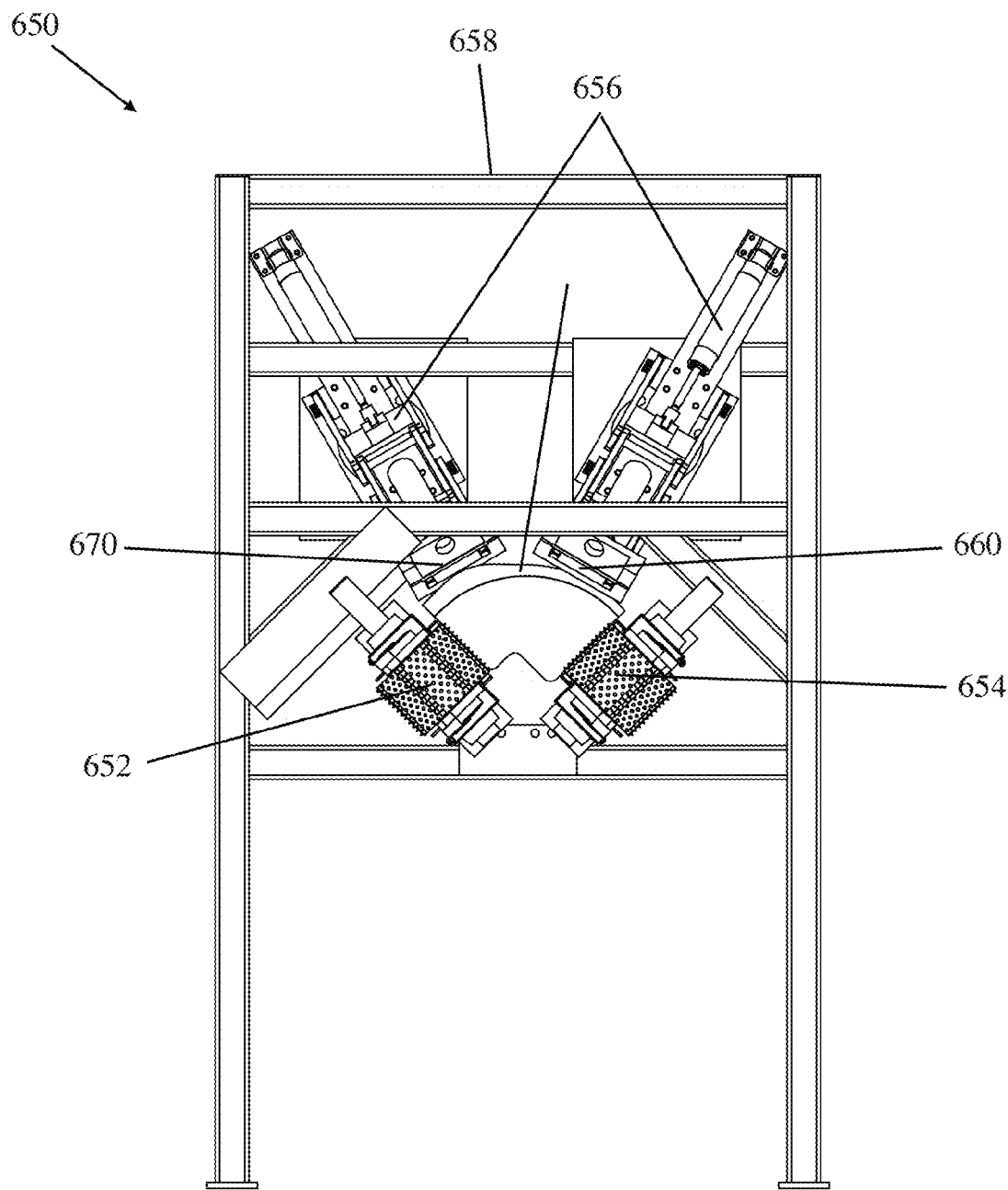
FIG. 11 is a front end view of the skinner system of FIGS. 9 and 10.

As shown in the alternate embodiment of FIGS. 9-11, loin portion 325 may be flipped and slightly rotated when being transferred from loin puller 100 to skinning station 650 such that the skin and fatback 312 now faces upward. This provides a better optical view of the fatback thickness of the loin portion. In this design, the conveyance mechanism preferably includes dual conveyors 652, 654 slanted inwards together to form a V-shape for assisting in the positioning of loin 325. Skinners 660, 670 may then be adjustable using positioning mechanisms 656 secured to frame portion 658.

Figure 12:
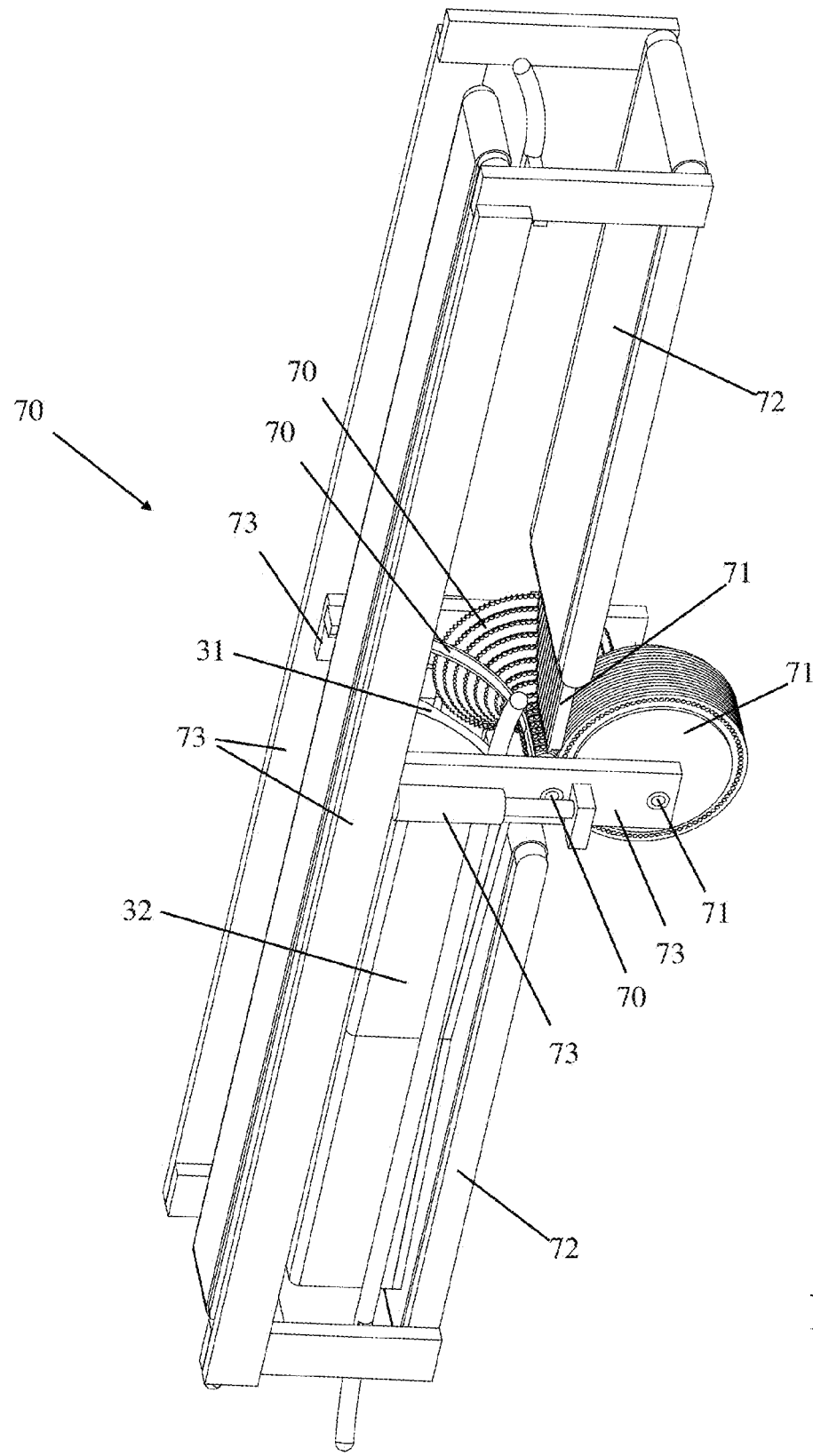
FIG. 12 is front perspective view of a skinner system having a contoured blade according to one embodiment of the disclosure.
Figure 13:
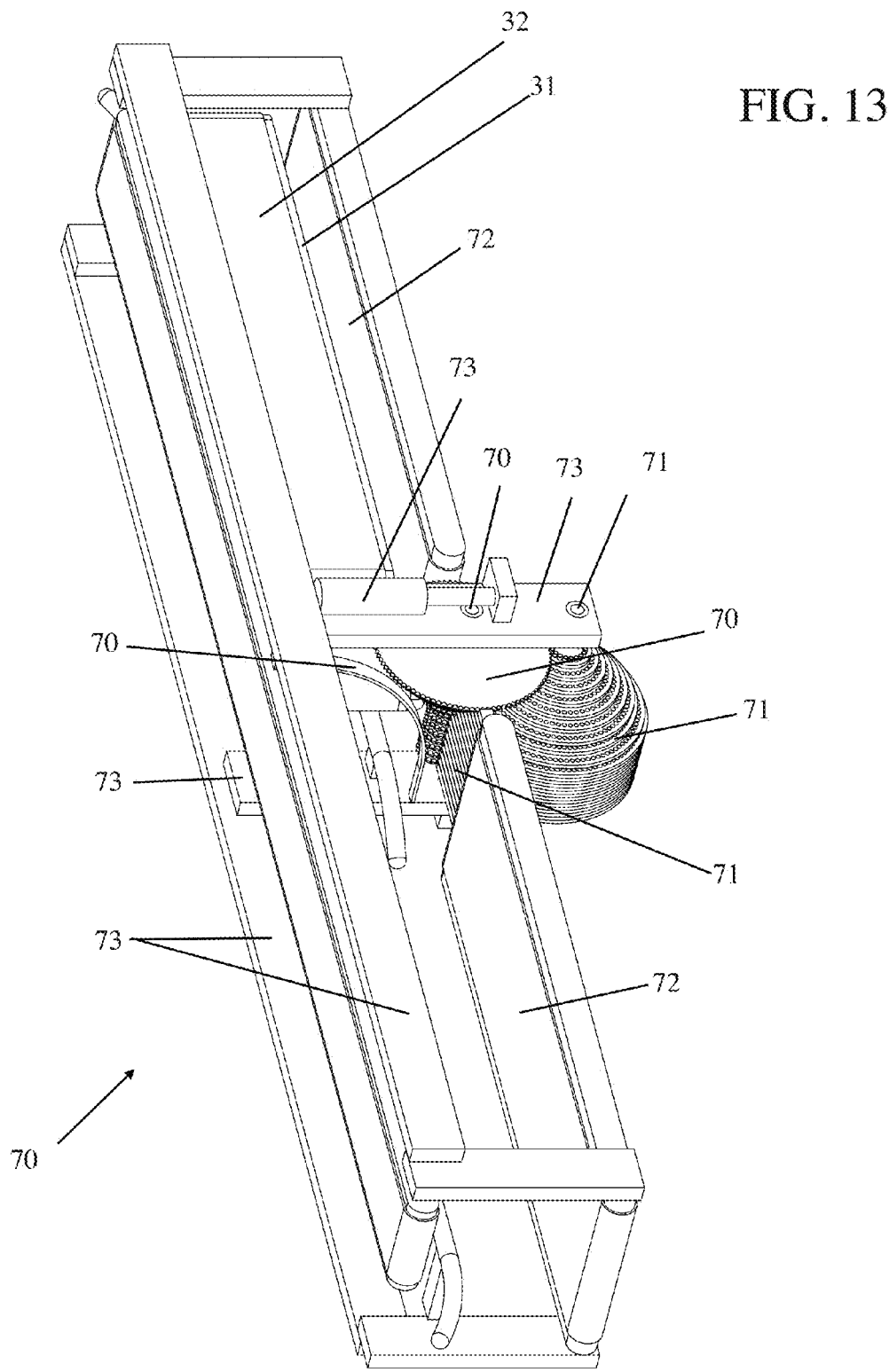
FIG. 13 is a rear perspective view of the skinner system of FIG. 12.
Figure 14:
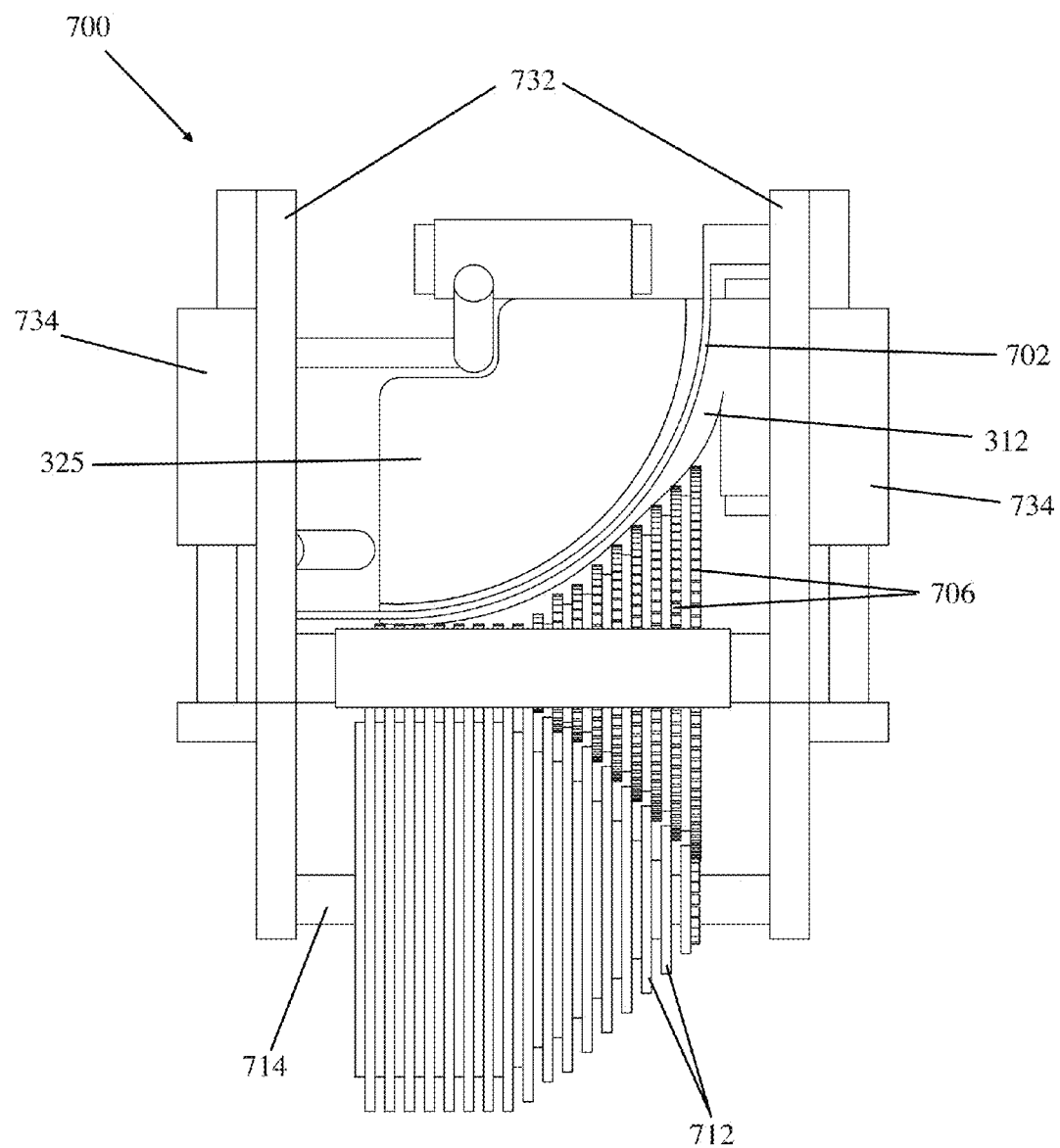
FIG. 14 is an end view of the skinner system of FIGS. 12 and 13.

Referring to FIGS. 12-14, a preferred skinning system 700 having blade 702 deigned specifically for bone-in loin carcass middles 116 is shown. While system 700 is shown for left carcass middles 116, it should be understood that a similar machine could be utilized for right carcass middles 116. Consistent with prior art skinners, skinner 702 includes a tooth roll assembly 704 that works in conjunction with blade 702 such that the forward motion of tooth roll 704 grabs the loin 325 from the in-feed conveyor 720 and pulls the loin toward and across blade 702 to trim the skin and a portion of the fatback 312. The skin and fatback 312 is preferably removed from the skinning area as a continuous strip and collected for use in processing other products, and out-feed conveyor 722 removes the finished loin 325. However, in contrast to skinner 702, current skinning systems use a fixed flat blade, a toothroll with a fixed diameter, and a pressure bar to create sufficient pinching force to the surface being skinned. Because the products typically being skinned are boneless, the pressure bar is able to lay the product substantially flat and allow the blade of the skinner to follow the substantially flat surface of the product. As explained in the Background section herein, these pinching systems are not suitable for bone-in loin portions 325 of carcass middles 116 because of the curved "saddle" shape of the loin portion 325 and the applied pressure would result in damage to the product.

In order to provide a contoured shape of blade 702, tooth roll assembly 704 preferably includes a plurality of independent tooth rolls 706 (shown more clearly in FIG. 14) of varying diameters secured to tooth roll drive shaft 708. The configuration of tooth rolls 706 having different diameters is designed to mirror or correspond to the basic shape of loin portion 325. In preferred embodiments, the contoured blade 702 is j-shaped similar to j-blade 176 of the dual-blade knife assembly 260 described above. However, due to the desired heavily contoured shape of the blade 702 resulting in tooth rolls 706 of several different diameters and the lack of pressure being applied to the top of loin 325, it is difficult to maintain equal surface speed of the loin 325 across each of the tooth rolls 706 of tooth roll assembly 704 as the loin 325 passes the contoured blade 702. For example, if the tooth roll assembly 704 was being driven at 100 rpm, the teeth of a 2 inch diameter roll would contact the product at 628 in/min while the teeth of a 4 inch diameter roll would contact the product at 1256 in/min.

To provide a consistent cut through the skin and fatback 312 of loin 325, the present skinner 700 preferably includes a separate drive roll assembly 710 to drive the tooth roll assembly 704. As shown, the drive roll assembly 710 is disposed below the tooth roll assembly 704 and includes a plurality of drive rolls 712 of varying diameters secured to drive roll drive shaft 714. As shown, the diameter and pitch of each drive roll 712 corresponds to the diameter and pitch of the particular tooth roll 706 driven by drive roll 712. For example, if tooth roll assembly 702 includes a plurality of tooth rolls 706 each having, for the sake of simplicity, one of a 2-inch diameter, 3-inch diameter, or 4-inch diameter, the drive roll assembly 710 would preferably include a plurality of drive rolls 712 having the same diameters. Tooth rolls 706 having a 2-inch diameter would then be paired with drive rolls 712 having a 4-inch diameter, the tooth rolls 706 having a 3-inch diameter would be paired with drive rolls 712 having a 3-inch diameter, and the tooth rolls 706 having a 4-inch diameter would be paired with drive rolls 712 having a 2-inch diameter. In operation, the drive roll assembly 710 works as a gear reduction for the tooth roll assembly 704 to allow the teeth of each independent tooth roll 706 to engage the loin 325 at the same speed, which provides for an even and smooth skinning process of a bone-in loin portion 325 using a contoured blade. It should be understood that tooth roll assembly 704 could be configured with different profiles based on the desired contour of the blade and how the individual tooth rolls 706 of varying diameters are stacked together. The drive roll assembly 710 must be stacked accordingly for proper engagement with the tooth roll assembly 704.

Figure 15:
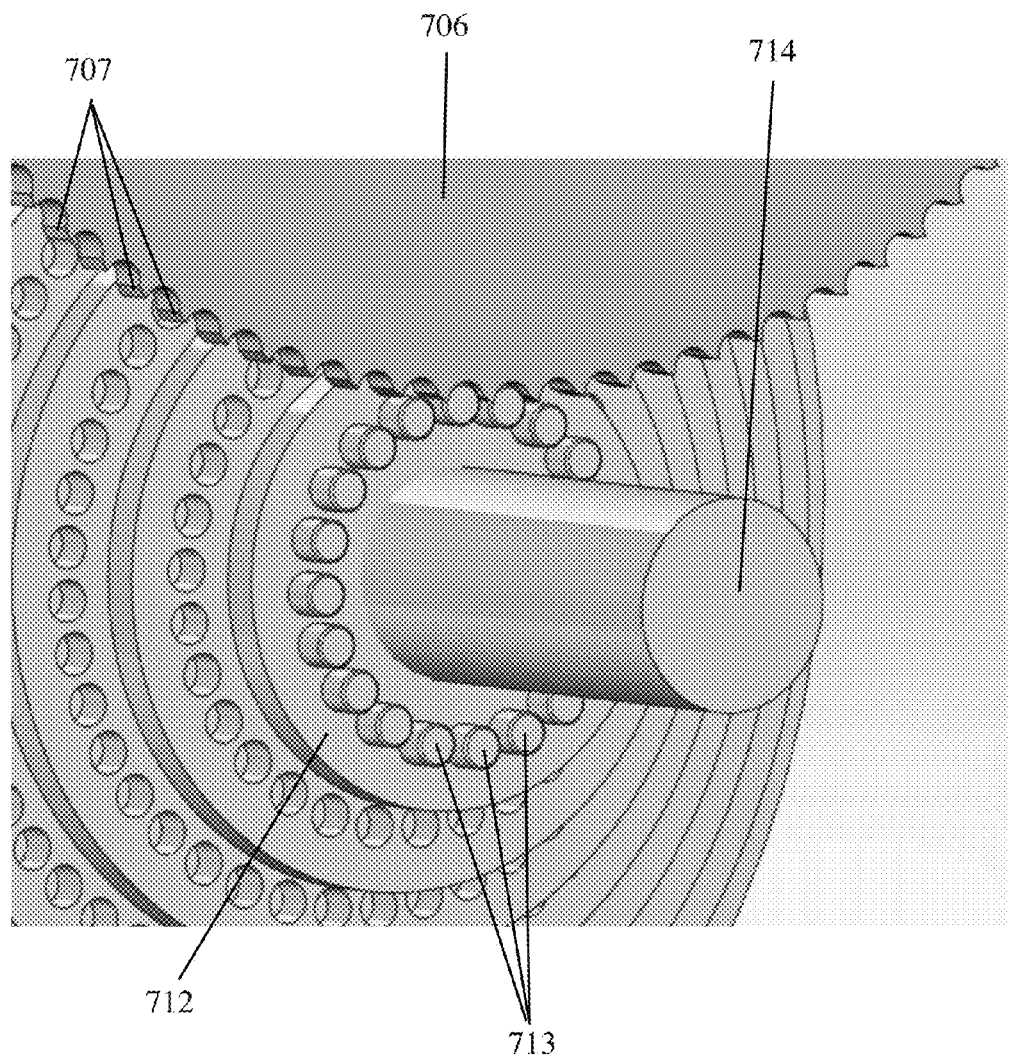
FIG. 15 is an enlarged view of drive roll assembly pin engagement with a tooth roll assembly according to one embodiment of the disclosure.

Referring to FIG. 15, an enlarged view of a preferred drive roll assembly 710 is shown. In this embodiment, instead of each drive roll 712 including engaging members (e.g., gear teeth) disposed on the outer circumference of the drive roll 712 that engage corresponding engaging members 707 of tooth roll 706, the engaging members 713 of drive roll 712 includes a plurality of drive pins 713 disposed adjacent the outer circumference of drive roll 712 but extending parallel to drive roll drive shaft 714. Drive pins 713 are disposed on drive roll 712 in a circular pattern having a diameter that corresponds to the diameter of tooth roll 706 to allow the teeth of each independent tooth roll 706 to engage the loin 325 at the same surface speed as explained above. For purposes of the present application, references to the diameter of a drive roll 712 refers to the diameter of the circular pattern of drive roll engaging members 707 whether the engaging members are gear teeth disposed on the outer circumference of the drive roll 712 or drive pins disposed adjacent the outer circumference of the drive roll 712 as shown in FIG. 15.

In preferred embodiments, a cleanout bar assembly 716 having a plurality of cleanout bars corresponding to the number of tooth rolls 706 of the tooth roll assembly 704 is provided between the tooth roll assembly 704 and the out-feed conveyor 722. Each cleanout bar is preferably disposed in grooves created by adjacent tooth rolls 706 preferably with minimal clearance between the cleanout bar and corresponding tooth roll 706. The length of each cleanout bar is dependent on the diameter of each tooth roll 706 the particular cleanout bar is disposed around. In other words, if one tooth roll 706 has a 2-inch diameter and a second tooth roll 706 has a 3-inch diameter, for example, the cleanout bar for the 2-inch diameter tooth roll will have a greater length than the cleanout bar for the 3-inch diameter tooth roll such that the total distance covered by the cleanout bar and the diameter of its corresponding tooth roll is the same for all tooth roll and cleanout bar combinations. The purpose of the cleanout bar assembly 716 is to remove debris (skin, fat, etc.) from the teeth 707 and grooves between the teeth 707 of the tooth rolls 706 as the tooth roll assembly 704 rotates.

In preferred embodiments, the tooth roll assembly 704, drive roll assembly 710, and cleanout bar assembly 716 are modular allowing for the user to change the desired profile of the skinning system 700 by replacing individual tooth rolls 706 with tooth rolls having different diameters until the desired cutting profile is achieved. Anytime a tooth roll 706 is changed out for a tooth roll of a different diameter, the appropriate changes must also be made to the corresponding drive roll 712 and cleanout bar. In other words, each tooth roll 706 of tooth roll assembly 704, drive roll 712 of drive roll assembly 710, and cleanout bar of cleanout bar assembly 716 may be replaced with a new tooth roll, drive roll, and cleanout bar to change the contour of the blade 702 as desired.

As shown, the tooth roll drive shaft 708 and drive roll drive shaft 714 are secured to positioning mechanisms disposed on the sides of skinning system 700. Positioning mechanisms preferably include mounting plates 732 which are operable to be driven vertically by height adjusting mechanisms 734 for raising and lowering the skinning blade 702 depending on the measured characteristics and alignment of the particular loin 325 being skinned. Mounting plates 732 are preferably removably secured to the height adjusting mechanisms 734 using a quick release mechanism, such as a quick release pin or lever, such that the entire skinning assembly, including the blade 702, tooth roll assembly 704, drive roll assembly 706, cleanout bar assembly 716, and mounting plates 732 are easily and quickly removed from the skinning system 700 for replacement, repair, and/or cleaning. For additional stability, mounting plates 732 may also be removably attached to the frame 736 of the skinning system 700 in a manner that permits vertical movement of the mounting plates 734 controlled by the height adjusting mechanisms 734.

While the skinning system 700 having a tooth roll assembly 704 driven by a drive roll assembly 706 to provide a contoured blade is shown and described above with respect to skinning a bone-in loin portion 325 of a carcass middle 116, it should be understood that the same concept can be used in any other skinning device designed to skin other types of products. Further, while skinning system 700 is particularly suited for automated skinners where a contoured blade is preferred, the same concept could also be applied in hand-held skinners.

In another aspect of the disclosure, the loin pulling apparatus includes temperature sensing mechanism for determining the temperature of a carcass middle prior to or as it is being loaded into the apparatus. The temperature reading can be accomplished manually by an operator, but it is preferably done electronically by an infrared temperature monitoring instrument. Other temperature sensing means could include direct contact sensors and other known thermo sensing devices. Together with other measured information taken of the carcass middle such as size, fatback 312 thickness, etc., the temperature reading is analyzed such that a desired cut profile is determined and selected from a plurality of installed profiles stored in the PLC using associated computer software. In preferred embodiments, the desired cut profile includes factors such as positioning of the carcass middle 116 on the conveyor 28, selective positioning of the blade assembly 260 and skinners 500, speed of conveyance, etc.

In preferred embodiments, the temperature readings are graded on a scale where each grade corresponds to a particular temperature of the carcass middle 116. For example, a temperatures below 30° F. could be given a first temperature grade, temperatures from 30-32° F. a second temperature grade, and so forth. The temperature grade is then analyzed, in conjunction with the other measured information, and compared to other data stored in a database to generate the desired cut profile. Such measurements occur in real time and can be continually updated as the carcass middle 116 proceeds through the machine.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An apparatus for processing a carcass middle portion of an animal, the apparatus comprising:
    a working surface onto which the carcass middle is positioned, the working surface supported by a frame above a support surface;
    a loin knife assembly disposed at a first selected location on the frame, the loin knife assembly for separating a loin portion from the carcass middle;
    a skinner assembly disposed at a second selected location on the frame, the skinner assembly for skinning skin and fatback from the loin portion;
    a conveyor for conveying the carcass middle past the first selected location to engage the loin knife assembly and past the second selected location to engage the skinner assembly; and
    a controller having a plurality of stored cutting profiles for controlling movement of the loin knife assembly and skinner assembly during processing of the carcass middle, the controller being operable to select one of the cutting profiles based on one or more measured characteristics of the carcass middle including at least a temperature reading.

2. The apparatus of claim 1 wherein the skinner assembly includes a blade and a positional mechanism for controlling positioning of the blade, the positional mechanism operable to articulate the blade inwards toward the loin portion as the loin portion is conveyed past the second selected location for assisting the blade in staying engaged with a contoured surface of the loin portion.

3. The apparatus of claim 1 wherein the carcass middle is conveyed past the loin knife assembly at the first selected location prior to being conveyed past the skinner assembly at the second selected location.

4. The apparatus of claim 1 wherein the skinner assembly includes a blade and a plurality of tooth rolls, the tooth rolls for assisting in pulling the skin of loin portion towards the blade, the tooth rolls operable to run in the same direction as the conveyor.

5. The apparatus of claim 4 wherein a speed of the tooth rolls during skinning is based at least in part on a speed of the conveyor.

6. The apparatus of claim 1 wherein the skinner assembly includes a contoured blade shaped at least in part based on a shape of the loin portion being skinned.

7. The apparatus of claim 6 wherein the skinner assembly further includes a plurality of tooth rolls having varying diameters based on the shape of the contoured blade and plurality of drive rolls having varying diameters based on the diameters of the tooth rolls for driving the plurality of tooth rolls.

8. The apparatus of claim 1 wherein the frame includes a first frame portion for supporting the loin knife assembly and a second frame portion for supporting the skinner assembly, the second frame portion disposed adjacent the first frame portion and connected to the first frame portion by the conveyor.

9. The apparatus of claim 1 further comprising a plurality of skinner assemblies for selective skinning of the loin portion.

10. A skinning system for skinning a meat product, the skinning system comprising:
    a contoured blade shaped at least in part based on a shape of the meat product;
    a tooth roll assembly having a plurality of tooth rolls of varying diameters based at least in part on the shape of the contoured blade, each tooth roll including a plurality of tooth roll engaging mechanisms for pulling the skin of the meat product towards the blade; and
    a drive roll assembly having a plurality of drive rolls, each drive roll including a plurality of drive roll engaging mechanisms configured to engage the tooth roll engaging mechanisms of one of the plurality of tooth rolls for driving the tooth roll,
    wherein the diameter of each drive roll is dependent on the diameter of the tooth roll being driven by the drive roll.

11. The skinning system of claim 10 wherein the drive roll engaging mechanisms include a plurality of drive pins disposed adjacent the outer circumference of the drive roll and extending parallel to a drive roll drive shaft.

12. The skinning system of claim 10 wherein the drive roll engaging mechanisms include a plurality of gear teeth disposed on the outer circumference of the drive roll.

13. The skinning system of claim 10 wherein each tooth roll and corresponding drive roll is operable to be replaced with another tooth roll and drive roll combination having different diameters such that the shape of the contoured blade is capable of being modified.

14. The skinning system of claim 10 further comprising a cleanout bar assembly, the cleanout bar assembly including a plurality of cleanout bars, each cleanout bar disposed adjacent one of the tooth rolls and the length of the cleanout bars being based at least in part on the diameter of the tooth roll the cleanout bar is disposed adjacent to.

15. The skinning system of claim 10 further comprising a positional mechanism for controlling positioning of the contoured blade, the positional mechanism operable to articulate the contoured blade inwards toward the meat product as the meat product is conveyed past the skinning system for assisting the contoured blade to stay engaged with a surface of the meat product.

16. An apparatus for processing a carcass middle portion of an animal, the apparatus comprising:
- a skinner assembly including at least one blade for skinning skin and fatback from a loin portion separated from the carcass middle portion and a positional mechanism for controlling positioning of the blade; and
- a controller having a plurality of stored skinning profiles for controlling movement of the positional mechanism during skinning of the loin portion, the controller being operable to select one of the stored skinning profiles based on one or more measured characteristics of the carcass middle including at least a temperature reading.

17. The apparatus of claim 16 further comprising a conveyor for conveying the loin portion through the skinner assembly, the skinner assembly further including a plurality of tooth rolls operable to run in the same direction as the conveyor for assisting in pulling the skin of loin portion towards the blade during skinning.

18. The apparatus of claim 17 wherein a speed of the tooth rolls during skinning is based at least in part on a speed of the conveyor.

19. The apparatus of claim 1 wherein the skinner assembly includes a contoured blade shaped at least in part based on a shape of the loin portion being skinned.

\* \* \* \* \*